United States Patent [19]
Braitmaier et al.

[11] Patent Number: 4,720,114
[45] Date of Patent: Jan. 19, 1988

[54] ROLLER MANDRELL CHUCK

[75] Inventors: Jürgen Braitmaier; Bodo Hammeley, both of Stuttgart, Fed. Rep. of Germany

[73] Assignee: Daimler-Benz Aktiengesellschaft, Stuttgart, Fed. Rep. of Germany

[21] Appl. No.: 800,802

[22] Filed: Nov. 22, 1985

[30] Foreign Application Priority Data

Nov. 22, 1984 [DE] Fed. Rep. of Germany ....... 3442585

[51] Int. Cl.$^4$ ............................................. B23B 31/40
[52] U.S. Cl. ....................................... 279/2 R; 82/44; 269/48.1
[58] Field of Search ........................... 269/48.1; 82/44; 279/1 L, 2 R, 75, 76, 77, 22, 24, 30, 68, 2 A, 1 R

[56] References Cited

U.S. PATENT DOCUMENTS

| | | | |
|---|---|---|---|
| 2,488,673 | 11/1949 | Madsen | 279/55 |
| 2,499,781 | 3/1950 | Rothenberger | 279/2 |
| 3,026,115 | 3/1962 | Brauer, Jr. et al. | 279/2 |
| 4,463,938 | 8/1984 | Dearman | 269/48.1 |

FOREIGN PATENT DOCUMENTS

| | | | |
|---|---|---|---|
| 915710 | 9/1952 | France | 279/75 |
| 651556 | 4/1951 | United Kingdom | 279/22 |

*Primary Examiner*—Z. R. Bilinsky
*Attorney, Agent, or Firm*—Barnes & Thornburg

[57] ABSTRACT

This invention relates to a ball-type chucking mandrel having several chucking balls that are arranged in an evenly distributed manner in the chucking area. These chucking balls are held in a uniform axial position by means of a contact shoulder. In addition, the chucking balls rest against a chucking body that can be shifted with respect to the contact body axially, but is secured with respect to rotation, said chucking body having a uniform cone surface or conical surface. In the case of an axial shifting of the chucking body, the chucking balls move radially to the outside or the inside. In order to also be able to exercise certain torques on the chucked body, the chucking balls are rigidly connected with one another in pairs so that the chucking balls cannot roll off at the chucked workpiece. The balls are connected with one another in pairs by means of pins, and these types of ball pairs are connected with one another to form a uniform set by means of a wire loop.

20 Claims, 5 Drawing Figures

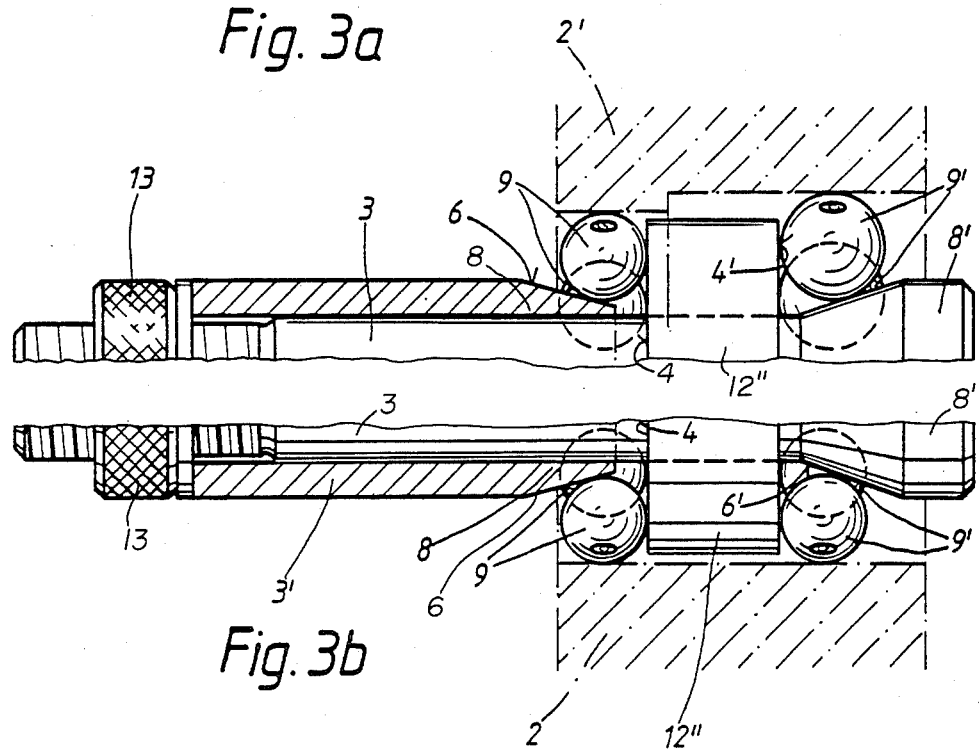
Fig. 3a
Fig. 3b
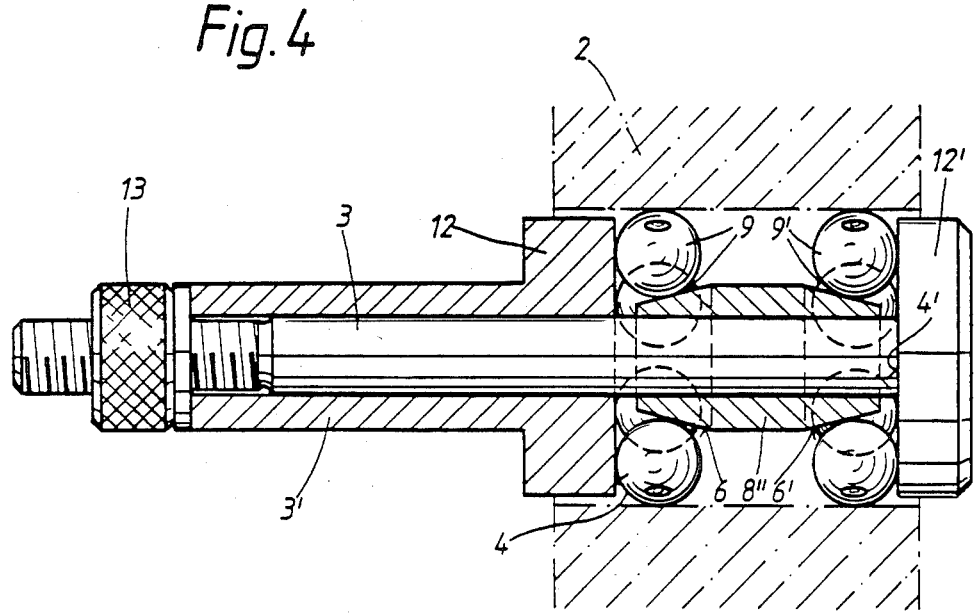
Fig. 4

ROLLER MANDRELL CHUCK

BACKGROUND AND SUMMARY OF THE INVENTION

This invention relates to a ball-type chucking mandrel that is used for the self-centering of valve stems of gas-changing valves as they are used in internal-combustion engines.

At a certain axial distance, two ball-type chucking mandrels are arranged mirror-symmetrically to one another. The advantage of the ball-type chucking mandrels is that with the precise centering characteristics of the chucking mandrel, larger diameter tolerances of the workpiece to be received may also be permitted. Since balls can be made with high precision in regard to shape and with a low diametrical tolerance, high centering precision can be achieved by means of ball-type chucking mandrels. A disadvantage of the ball-type chucking mandrels is that because of the point contact only relatively low chucking powers can be applied. It is also a disadvantage in the case of the known ball-type chucking mandrels that only small torques can be transferred since, despite a certain bracing of the chucking balls between the conical surfaces and the workpiece, a "ball bearing effect" will still occur. A rolling-off of the balls occurs between the workpiece to be braced and the conical surface. It is true that the known ball-type chucking mandrel has a guide cage for the chucking balls which is fixed in the rotating direction and thus hinders this rolling process. Nonetheless, a certain rolling-off effect can still occur, namely when the chucking balls can turn within the cage.

It is an objective of the invention to improve the ball-type chucking mandrels on which this invention is based, without a cage for the chucking balls, in such a way that the "ball bearing effect" that occurs can be avoided and larger torques may be transferred by means of the ball-type chucking mandrels.

This objective is achieved by rigidly connecting the balls together in pairs. Because of the pairing of two chucking balls into a rigid dumbbell-shaped unit, a rolling-off of the balls in the circumferential direction is avoided. In addition, because of this arrangement and the mutual connection of the chucking balls, their number is increased, which also increases the chucking power. The centering precision is not affected by the precision of the mutual fixing of two balls into a pair of balls. In the case of a rod-shaped connection of two balls by means of a connecting pin, this connecting pin may easily extend eccentrically with respect to the center of the ball. The mutual distance of the balls within the pair of balls is also not critical.

Further objects, features, and advantages of the present invention will become more apparent from the following description when taken with the accompanying drawings(s) which show, for purposes of illustration only, an embodiment/several embodiments in accordance with the present invention.

BRIEF DESCRIPTION OF THE DRAWINGS

FIGS. 3a and 3b are schematic front view of two different variants of a ball-type chucking mandrel having two crowns of chucking balls by means of which stepped bores may also be chucked (FIG. 3a); and FIG. 4 is a view similar to 3a and b showing a ball-type chucking mandrel having two crowns of chucking balls according to preferred embodiments of the invention.

DETAILED DESCRIPTION OF THE DRAWINGS

Figure 1:
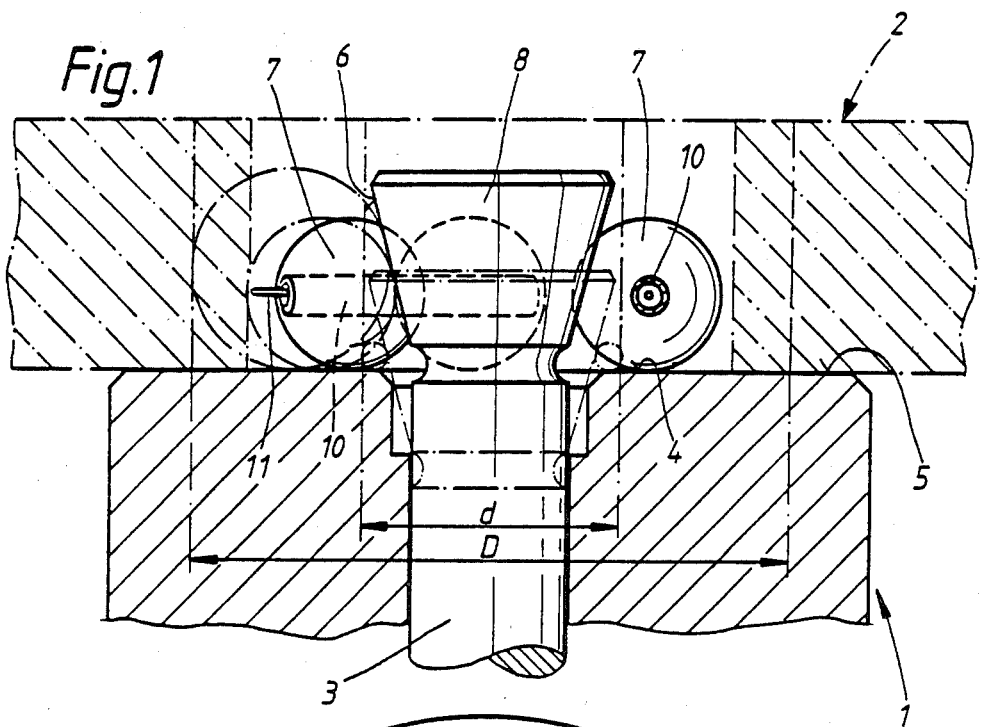
FIG. 1 is a schematic front view through a ball-type chucking mandrel according to preferred embodiments of the invention.

The ball-type chucking mandrel shown in FIG. 1 is integrated into a head 1 of a measuring part, on the upper side of which a workpiece 2 is to be precisely centered for measuring purposes. A centering pin 3 is worked into the head with very little play, and is axially slidable in the head 1. The centering pin determines the center position of the workpieces to be received. A conical chucking body 8 having a conical surface 6 is centrally mounted at the top of the centering pin 3. The conical surface can be centralized with respect to the cylindrical surface of the centering pin with very high precision. As a result, the conical surface 6 also has a very good centering precision.

The top side of the head 1 has a surface extending around in an axially perpendicular direction, of which the radially inside part forms a guide surface 4 for the chucking balls 7. In the case of the shown embodiment, this guide surface, without steps, coincides with the corresponding contact surface 5 for the workpiece 2. The ball guide surface 4 secures a uniform axial position of all chucking balls. A group of chucking balls 7 is arranged around the conical chucking body 8, said chucking balls 7, by pulling back the centering pin 3 of the chucking body 8, being pushed radially toward the outside. As a result, the chucking balls 7 place themselves against the interior side of a receiving bore of the workpiece 2 and chuck this workpiece while they are centering it. Since the balls can be manufactured with a very high precision in regard to shape and low diametrical tolerance, a very high centering precision during the chucking can be achieved by means of a ball-type chucking mandrel of this type.

Figure 2:
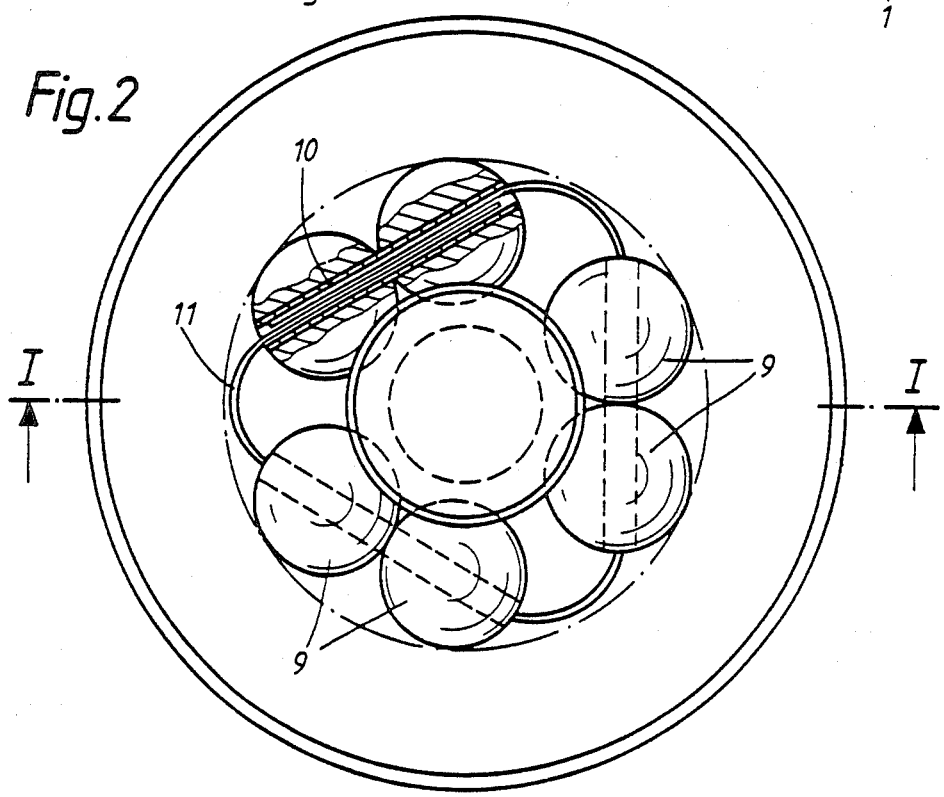
FIG. 2 is a top view of the ball-type chucking mandrel according to FIG. 1.

The centering pin 3 is fixed in the rotatable part head 1 without play in the rotating direction. In order to be able to transfer relatively large torques from the part head 1 to the workpiece, two of the chucking balls 7 are combined into a rigidly connected pair of balls 9. As shown in FIGS. 1 and 2, the chucking balls 7 are drilled hollow and connected with one another in pairs 9 by means of a connecting pin. The connecting pin may be pressed in or glued in. Instead of a connection by means of a connecting pin, preferred embodiments include welding two chucking balls together by means of high-energy beam welding in the area of the contact point. The mutual distance of the two balls within one pair of balls is not essential for the centering precision of the chucking mandrel. The pairs of balls used inside a chucking mandrel may have different center distances causing the individual balls to take up different circumferential positions at the contact surface 6 of the chucking, however, these positions do not affect the centering precision. In order for the ball pairs to take up the least amount of space in the circumferential direction, a preferred embodiment provides that the chucking balls 7 that are united into pairs 9 are located as close to one another as possible and therefore touch one another with their ball surfaces. This minimization of space is especially important when very large chucking balls are used. At least six chucking balls and therefore three pairs of balls must have room at the circumference of the chucking body 8.

In order to be able to combine the set of ball pairs 9 of one chucking mandrel into one easily manageable unit, the connecting pins shown in the embodiment are developed as small tubes. As a result, the ball pairs 9 may be threaded onto a spring-elastic open wire ring 11 so that a closed loop is obtained that can be expanded in its diameter. The set of ball pairs that belongs together is thus held together, which is especially important in the case of a storage of different sets of ball pairs having different ball diameters. The exchange of such pairs of balls can also be facilitated when this type of set can be slid uniformly over a chucking body. As a result, a ball-type mandrel can be reset easily with respect to changed chucking diameters. A set of ball pairs with a different diameter must only be fitted on in order to obtain a changed chucking range. A continuous chucking range can be obtained by means of one set of ball pairs, where the chucking range corresponds to the difference in diameter of the conical surface 6 of the chucking body 8 at its largest point and its smallest point.

Instead of an open spring-elastic wire ring, a preferred embodiment provides that a rubber string may also be pulled through the connecting pins 10 that have the shape of small tubes. The string must at one point be knotted or connected in another way to form a continuous loop. Other preferred embodiments include loose unelastic string or a small chain. The set of balls must be able to be expanded far enough so that it can be lifted over the large cone diameter of the chucking body 8. In order to be able to cover a range of chucking diameters that is as large as possible without interruptions, it is required that in addition to a complete utilization of the whole axial length of the conical chucking body 8, as mentioned, different sets of ball pairs are also kept available. The ball pairs may be relatively roughly graded in the diameter, namely, corresponding to the difference in radiuses of the conical surface 6 at the large as compared to the small diameter. A slight overlapping of the different chucking ranges will be selected, resulting in a staggering corresponding to a somewhat smaller diametrical difference of the balls. In the case of a complete utilization of the chucking range, a diametrical range of 1:3 can be bridged with the same chucking body, in which case the smallest chucking diameter corresponds to the largest cone diameter at the chucking body 8. It is practical to use balls that are available from producing ball bearings which, as mentioned before, are manufactured with high precision with respect to shape and low diametrical tolerance on a large-scale basis and in a cost-effective manner. The bore can be placed in the hardened steel balls by means of eletrical discharge machining.

In order to achieve a uniform circumferential position of the ball pairs, preferred embodiments provide for the insertion of distance-maintaining intermediate pieces between the individual pairs of balls. This may, for example, take place by small coil springs or small pieces of hose that are threaded onto the wire ring 11. A slightly uneven arrangement of the ball pairs in the circumferential direction is not necessary for good centering precision. When smaller chucking balls are used, more than three pairs of balls may also be provided within one set of chucking balls, such as four or five pairs of balls. All balls of a set more or less equally participate because the diameters of the chucking balls approximately correspond to one another and because of the manufacturing precision of the conical surface at the chucking body. As many additional pairs of balls as are necessary should be inserted into a set of chucking balls to cover the circumference as completely as possible with pairs of balls so that the gaps between the balls are as small as possible. As a result, distance-maintaining intermediate pieces can be largely avoided.

Ball-type chucking mandrels can also be constructed according to other contemplated embodiments of the invention where the chucking body is constructed as a hollow sleeve-shaped member with a cone-shaped surface which extends around the axially perpendicular guide surface 4 for the balls. The contact body 12" forming the guide surface 4 on the outside, must be machined precisely cylindrically and must center the sleeve-shaped chucking body very precisely in the radial direction. The chucking body should also be fixed in the rotating direction with respect to the contact body. This mutual guiding, as well as the manufacturing precision of the conical surface at the sleeve-shaped chucking body, essentially determines the centering precision of the chucking mandrel that is constructed in accordance with this preferred embodiment. A chucking mandrel of this type is suited for the centric chucking of cylindrical workpieces. When three pairs of balls are used, triangular prismatic workpieces may also be chucked. When four pairs of balls are used, square prismatic workpieces may be chucked, etc.

In the case of the embodiments according to FIGS. 3a, b and 4, two groups of chucking ball pairs 9 or 9' are provided by means of which the workpiece 2 or 2' can be chucked precisely axially perpendicular to a chucking mandrel without an axially perpendicular workpiece contact surface at a part head or similar part. One conical surface 6 or 6' and one axially perpendicular guide surface 4 or 4' respectively are assigned to the two groups of ball pairs 9 or 9', said guide surface 4 or 4' and conical surface 6 or 6' gripping the pertaining ball group between each another. The two conical surfaces 6 and 6' and the two guide surfaces 4 and 4' are arranged in a mirror-image inverted manner with respect to one another and also with respect to the ball groups. In the case of the two embodiments according to FIGS. 3a, b, the conical surfaces are disposed axially on the outside at two chucking bodies 8 or 8" that can be moved in different ways, in which case the left chucking body 8 is disposed at a centering sleeve 3' and the right chucking body 8' is disposed at a centering pin 3 extending into it. The two axially interior axially perpendicular guide surfaces 4 and 4' are disposed at a uniform contact body 12" which is disposed to be axially moveable on the centering pin 3. By means of the axial shifting of the centering sleeve 3' on the centering pin 3 by means of the tension nut 13, the conical surfaces 6 and 6' can be brought near the guide surfaces 4 and 4' and the chucking balls can be pushed radially toward the outside.

In the case of the embodiment according to FIG. 3a, larger chucking balls are used in the ball group shown on the right than in the ball group shown on the left so that the workpiece 2' may be chucked precisely centrically and axially perpendicularly at its stepped bore. Small diametrical differences in a stepped bore may be easily bridged without the use of different ball diameters, by moving the conical surface 6' in the area of the larger bore diameter at the workpiece 2' closer to the respective associated guide surface 4' than to the smaller bore diameter. The lower half of the picture of FIG. 3, namely FIG. 3b, shows the chucking of a workpiece 2 having a uniformly continuous workpiece bore while using identically sized ball groups.

In the case of the embodiment shown in FIG. 4, the conical surfaces and contact and guide surfaces 6 and 4 or 6' and 4' respectively are shown with exchanged sides with respect to the embodiment according to FIGS. 3a, b, i.e., the axially perpendicular guide surfaces 4 and 4' in that case are axially disposed on the outside on screwhead-type contact bodies 12 and 12' of the centering bush 3' or the centering pin 3. The two conical surfaces 6 and 6' are in the center axially disposed on a uniform chucking body 8' that is disposed to be axially moveable on the centering pin 3. The method of operation of this chucking mandrel is the same as that of the chucking mandrel according to FIGS. 3a, b. Also in the case of this chucking mandrel, chucking balls with different diameters may be used in order to be able to chuck workpieces with a stepped bore. For reasons of completeness, it should be be mentioned that in the case of both embodiments according to FIGS. 3a, b and FIG. 4, that within certain limits, stepped bores can be chucked cleanly with the same ball groups on the left and on the right, as can unstepped bores, with different ball groups. In the same manner, workpieces having a slightly conical bore can also be chucked precisely centrically and axially perpendicular.

The advantages of the invention are a very precise automatic centering of workpieces while they are being chucked, in which case a centering error of less than 2 $\mu$m can be reached. In addition, a non-positive rotational slaving of the chucked workpiece is possible with a relatively high torque. In the case of the same chucking body, a chucking range d to D of 1:3 is theoretically possible. In practice, however, this range is at least 1:2. The ball-type chucking mandrels according to the invention can be easily reset to changed chucking ranges.

Although the present invention has been described and illustrated in detail, it is to be clearly understood that the same is by way of illustration and example only, and is not to be taken by way of limitation. The spirit and scope of the present invention are to be limited only by the terms of the appended claims.

We claim:

1. A ball-type chucking mandrel comprising:
    contact body means defining a predetermined guide surface means,
    chucking ball means disposed for guiding movement on said guide surface means,
    and a mandrel means exhibiting a predetermined contact surface engaging against the ball means to forcibly move the ball means to a position of gripping a chucking area of a workpiece,
    wherein said chucking ball means include chucking balls which are rigidly connected to one another in pairs to prevent roll off of the chucking balls in the circumferential direction,
    a plurality of these pairs being distributed at the contact surface of the mandrel means when in an in use operative position.

2. A ball-type chucking mandrel according to claim 1, wherein said mandrel is an internal ball-type chucking mandrel with said contact surface facing radially outward with respect to an axial direction of relative movement of the mandrel means and ball means.

3. A ball-type chucking mandrel according to claim 2, wherein said contact surface has uniform cone or conical shape.

4. A ball-type chucking mandrel according to claim 2, wherein said chucking mandrel is axially shiftable with respect to the guide surface means.

5. A ball-type chucking mandrel according to claim 2, wherein the connected ball means touch one another with their surfaces.

6. A ball-type chucking mandrel according to claim 2, wherein distance-maintaining intermediate pieces are provided between the ball pairs.

7. A ball-type mandrel according to claim 2, wherein the guide surface means securing the uniform axial position of the chucking ball means is provided at a shoulder surrounding the mandrel means.

8. A ball-type chucking mandrel according to claim 7, wherein the pairs of balls are connected with one another to form a closed loop by means of one of the following: strings, wires, or chains.

9. A ball-type chucking mandrel according to claim 8, wherein the ball pairs that are connected by means of tube-shaped connecting pins are threaded onto a spring-elastic open wire ring.

10. A ball-type chucking mandrel according to claim 8, wherein the guide surface means of the chucking ball means also forms a contact surface for axially fixing the position of a workpiece to be chucked.

11. A ball-type chucking mandrel according to claim 2, wherein two groups of chucking ball pairs are provided at an axial distance from one another, one conical surface and one guide surface positioned perpendicular to the axial direction being respectively assigned to said groups, said two conical surfaces and said two axially perpendicular guide surfaces being arranged in a mirror-inverted manner with respect to one another and to the chucking ball pairs.

12. A ball-type chucking mandrel according to claim 11, wherein said two conical surfaces are located between the respective centers of the groups of ball pairs.

13. A ball-type chucking mandrel according to claim 11, wherein said two guide surfaces are disposed at respective opposite ends of a uniform body, said uniform body being arranged to be axially moveable on a centering pin.

14. A ball-type chucking mandrel according to claim 11, wherein said two contact surfaces are disposed at respective ends of a uniform body.

15. A ball-type chucking mandrel according to claim 11, wherein one group of chucking ball pairs is larger than the other group of pairs, whereby a workpiece with a stepped bore may be chucked precisely.

16. A ball-type chucking mandrel according to claim 14, wherein both groups of ball pairs are the same size, wherein a workpiece having a uniform bore may be chucked precisely.

17. A ball-type chucking mandrel comprising:
    contact body means defining a predetermined guide surface means,
    chucking ball means disposed for guiding movement on said guide surface means,
    and a mandrel means exhibiting a predetermined contact surface engaging against the ball means to forcibly move the ball means to a position of gripping a chucking area of a workpiece,
    wherein said chucking ball means include chucking balls having drilled bores and which are rigidly connected to one another in pairs by a connecting pin through said bores, a plurality of these pairs being distributed at the contact surface of the mandrel means when in an in use operative position, wherein said mandrel is an internal ball-type chucking mandrel with said contact surface facing radially outward with respect to an axial direction of relative movement of the mandrel means and ball means.

18. A ball-type chucking mandrel according to claim 17, wherein the connecting pin is a small tube.

19. A ball-type chucking mandrel according to claim 18, wherein the connecting pin is glued into the ball bore.

20. A ball-type chucking mandrel comprising:

contact body means defining a predetermined guide surface means, chucking ball means disposed for guiding movement on said guide surface means, and a mandrel means exhibiting a predetermined contact surface engaging against the ball means to forcibly move the ball means to a position of gripping a chucking area of a workpiece, wherein said chucking ball means include chucking balls which are rigidly welded to one another in pairs, a plurality of these pairs being distributed at the contact surface of the mandrel means when in an in use operative position, wherein said mandrel is an internal ball-type chucking mandrel with said contact surface facing radially outward with respect to an axial direction of relative movement of the mandrel means and ball means.

* * * * *